United States Patent
Stenmark et al.

(10) Patent No.: US 8,141,572 B2
(45) Date of Patent: Mar. 27, 2012

(54) HIGH PRESSURE ISOLATION VALVE SYSTEM

(75) Inventors: Lars Stenmark, Trosa (SE); Pelle Rangsten, Storvreta (SE)

(73) Assignee: NanoSpace AB, Uppsala (SE)

( * ) Notice: Subject to any disclaimer, the term of this patent is extended or adjusted under 35 U.S.C. 154(b) by 1013 days.

(21) Appl. No.: 12/089,204

(22) PCT Filed: Oct. 4, 2006

(86) PCT No.: PCT/SE2006/050375
§ 371 (c)(1),
(2), (4) Date: Apr. 4, 2008

(87) PCT Pub. No.: WO2007/040455
PCT Pub. Date: Apr. 12, 2007

(65) Prior Publication Data
US 2008/0265192 A1 Oct. 30, 2008

(30) Foreign Application Priority Data
Oct. 4, 2005 (SE) ........................................ 0502166

(51) Int. Cl.
*F16K 17/16* (2006.01)
*F16K 17/40* (2006.01)

(52) U.S. Cl. .................... 137/15.19; 137/68.12; 137/69; 137/550; 137/557

(58) Field of Classification Search ............... 137/68.12, 137/69, 76, 550, 557, 15.19; 251/11
See application file for complete search history.

(56) References Cited

U.S. PATENT DOCUMENTS

| | | | | |
|---|---|---|---|---|
| 2,115,371 A * | 4/1938 | Mossberg | ...................... | 137/69 |
| 3,017,894 A * | 1/1962 | Chilcoat | ......................... | 137/69 |
| 3,209,937 A * | 10/1965 | Hirst et al. | ...................... | 137/69 |
| 3,618,822 A * | 11/1971 | Hildenbrandt, Jr. | ............ | 137/69 |
| 4,289,327 A * | 9/1981 | Okada | ............................. | 137/69 |
| 4,561,630 A * | 12/1985 | McCulloch | ..................... | 137/69 |
| 5,664,803 A * | 9/1997 | Skånberg et al. | ................ | 137/69 |
| 5,860,443 A * | 1/1999 | Soemer et al. | .................. | 137/69 |
| 5,947,143 A * | 9/1999 | Moakes et al. | .................. | 137/69 |
| 2004/0237658 A1 | 12/2004 | Ohms et al. | | |

FOREIGN PATENT DOCUMENTS

| | | |
|---|---|---|
| DE | 35 20 416 A1 | 12/1986 |
| DE | 101 33 013 A1 | 1/2003 |
| EP | 0 873 789 A2 | 10/1998 |
| WO | 03/089065 A1 | 10/2003 |

\* cited by examiner

*Primary Examiner* — John Rivell
(74) *Attorney, Agent, or Firm* — Young & Thompson

(57) ABSTRACT

An isolation valve system includes a main body (32), an actuator body (34) and a sealing membrane (307) arranged at a high pressure portion (36) of the isolation valve system. The sealing membrane mechanically attaches the actuator body to the main body. The sealing membrane further seals the high pressure portion from a low pressure portion (38). A burst plug (315) is arranged against the main body and supports the actuator body. An activation arrangement (50) is arranged for allowing an at least partial displacement of the burst plug, typically causing a phase transition. The sealing membrane is dimensioned to break when the actuator body is moved due to the displacement of the burst plug. The isolation valve system includes preferably a stack (30) of substrates (301-304) being bonded together. The substrates have micromechanical structures, which form at least the actuator body and the sealing membrane.

18 Claims, 6 Drawing Sheets

HIGH PRESSURE ISOLATION VALVE SYSTEM

TECHNICAL FIELD

The present invention relates in general to high-pressure isolation valves and in particular to valve arrangements and methods for single use high-pressure isolation valves.

BACKGROUND

In spacecraft applications, propulsion systems based on use of a propellant substance, e.g. a gas or a liquid, are frequently utilized. An often occurring demand in this connection is to isolate a propellant supply tank for a long time, sometimes for many years, before the propellant is to be used. For instance, in applications of interplanetary space missions, the propulsion system may have to be inactive for sometimes many years until the spacecraft reaches its distant object. At that time the propulsion system must perform with full capacity and with a high degree of confidence. On micro/nano satellites, the allowed tank volume is very small and furthermore the access is limited during launch preparation, due to the normal piggy-back situation. A perfect propellant tank isolation is always highly desirable, but of outermost importance in such applications. Obviously propellant leakage must be avoided with a high degree of confidence. One way to reduce the leakage problem is to use liquid or solid propellant. However, the use of gaseous propellants or pressurized gas is in many cases necessary.

Helium is used in many bipropellant systems as pressurant gas and it has typically to be stored in high-pressure tanks. The growing use of electrical propulsion with Xenon or Krypton as propellant gas also requires leak tight high-pressure tanks. Cold gas thrusters can be used for high accuracy attitude control, in particular if spacecraft contamination is a major concern. The cold gas system uses very benign propellant gases, but requires normally high-pressure tanks to store the gas. To avoid a disturbing loss of the supply, gas or liquid, the isolation valve between the storage tank and the actual propulsion device must be absolutely leak tight. The isolation valve also has to be absolutely reliable in function when activated. This is normally solved in prior art propulsion spacecraft arrangements by use of a one-shot isolation valve, i.e. a valve that is designed for a single use. A common type in prior art is the pyro-valve.

Pyro-valves use one or several pyrotechnical charges to open a normally closed valve. The opening function is achieved either by pushing a hollow pin through a membrane, or to create a gas pressure, which in turn breaks a sealing membrane. Pyro-valves are considered hazardous because of the explosive nature of their actuation charges. This results in a need for safety precautions and thereby associated high costs. Another problem of all qualified pyrovalves in prior art is that they are very large and heavy, at least compared to a micro spacecraft. Increasing performance requirements and miniaturization demands in space technology call for new, more mass efficient, arrangements. Silicon or ceramics are in general very suitable for manufacturing spacecraft components, but the size and brittleness of such components makes the use of high energetic actuation methods such as pyrotechnical charges very difficult to use, without risking damaging the spacecraft component.

A general problem with prior art high-pressure isolation valves for single use is that they are large, heavy, expensive, hazardous and risk to damage surrounding equipment.

SUMMARY

An object of the present invention is to provide improved high-pressure isolation valves and methods for operating such valves. A further object of the present invention is to provide high-pressure isolation valves and methods for operating such valves based on a slow action for opening the valve. Another further object of the present invention is to provide high-pressure isolation valves and methods for operating such valves being compatible with miniaturization demands.

The above objects are achieved by devices and methods according to the enclosed patent claims. In general words, in a first aspect, an isolation valve system comprises a main body, an actuator body and a sealing membrane. The sealing membrane is arranged at a high pressure portion of the isolation valve system. The sealing membrane mechanically attaches the actuator body to the main body. The sealing membrane further seals the high pressure portion of the isolation valve system from a low pressure portion of the isolation valve system. A burst plug is arranged against the main body and supports the actuator body. An activation arrangement is arranged for allowing an at least partial displacement of the burst plug whereby the sealing membrane being dimensioned to break by action of the high pressure when the actuator body is moved a distance allowed by the at least partial displacement of the burst plug. The at least partial displacement of the burst plug is preferably a shape change, more preferably caused by a phase transition of the burst plug. The isolation valve system comprises preferably a stack of substrates being bonded together. The substrates have micromechanical structures, which form at least the actuator body and the sealing membrane.

In a second aspect, a method for opening an isolation valve according to the first aspect comprises displacing of the burst plug at least partially by operating the activation arrangement. The at least partial displacement allows for moving, by means of the high pressure, the actuator body a distance. The method further comprises breaking of the sealing membrane by the moving action and flowing a gas from the high pressure portion of the isolation valve system through the broken sealing membrane to the low pressure portion of the isolation valve system.

In a third aspect, a manufacturing method for an isolation valve comprises providing of a number of substrates and creating micromechanical structures in the substrates. The micromechanical structures together form a main body, an actuator body and a sealing membrane of the isolation valve. The sealing membrane mechanically connecting said actuator body to said main body. The method further comprises arranging of a burst plug against the main body and for supporting the actuator body and providing of an activation arrangement for allowing an at least partial displacement of the burst plug. The manufacturing method further comprises bonding of the substrates together into a stack, whereby the sealing membrane becomes arranged for sealing a high pressure portion of the isolation valve system from the low pressure portion of the isolation valve system.

One advantage with the present invention is that an isolation valve can be opened in a reliable manner by means of a relatively slow and soft at least partial displacement of the burst plug. No pyrotechnical solutions are necessary. The invention is furthermore very well adapted to miniaturization requirements. Moreover, the probability for leaks at the high pressure side is significantly reduced.

BRIEF DESCRIPTION OF THE DRAWINGS

The invention, together with further objects and advantages thereof, may best be understood by making reference to the following description taken together with the accompanying drawings, in which.

DETAILED DESCRIPTION

Following the miniaturization trend for spacecrafts, it is an obvious advantage if the conventional pyrovalves can be replaced with a micro mechanical counterpart. A conventional pyrovalve relies on pyrotechnic actuation, which in worst case can cause dangerous pyroshocks in the system. The principle of the present invention is to use an actuation that is acting slow and gently. The absence of explosives or pyrotechnical material also simplifies system integration. Such a gentle opening of a valve also has to be reliable, i.e. be based on mechanisms that are highly predictable.

According to the present invention an actuator body is suspended in sealing membrane. The sealing membrane is when mounted exposed for high pressures. In closed condition, a burst plug supports the actuator body, which prohibits breakage of membrane when the system becomes pressurized.

When opening the isolation valve, a novel method is presented which gently breaks the sealing membrane removing the supporting action of the burst plug. The sealing membrane breaks due to increased mechanical strain induced due to a physical movement of the actuator body, which occurs when the burst plug does not support the actuator body against the forces applied on the actuator body from the high pressure.

In order to operate, the burst plug has to be at least partially displaced for allowing the actuator body to move. One type of partial displacement is a shape change, which can be induced by a phase change or phase transition. Such a phase transition, e.g. from a solid phase to a flowable condition, is caused by melting or at least softening of the burst plug. Such an action can easily be performed on a command from outside the isolation valve system.

The valve in the invention relies on rupture of a membrane sealing a flow passage, permitted e.g. by melting of a low melting point washer used as a burst plug. The use of a membrane, in particular if the membrane is manufactured as an integrated part of the isolation valve main body, reduces the probability for leaks at the high pressure side.

Figure 1:
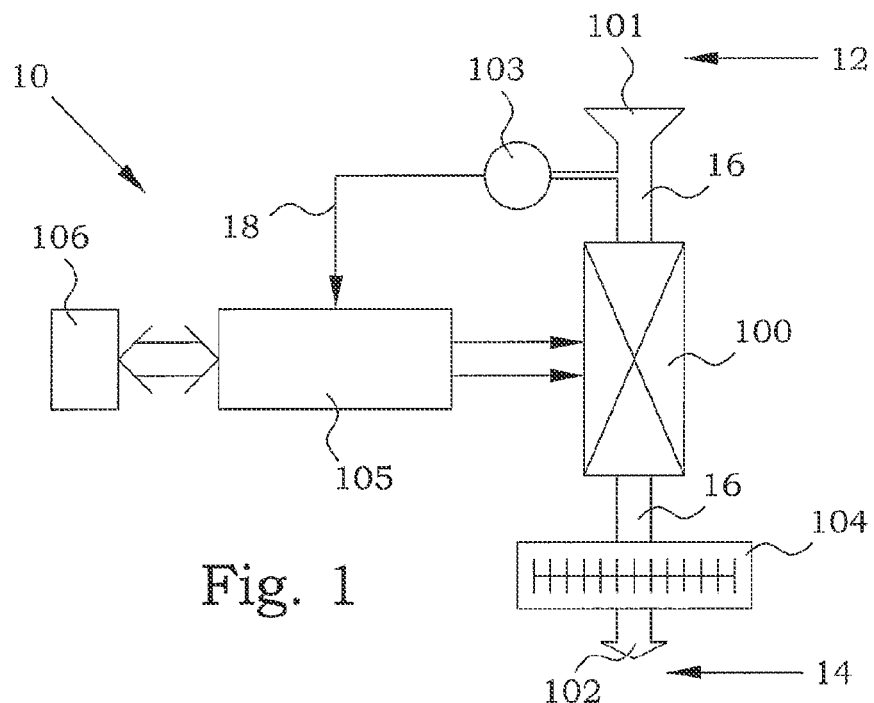
FIG. 1 is a block diagram of an embodiment of an isolation valve system according to the present invention.

FIG. 1 is a block diagram of an embodiment of an isolation valve system 10 according to the present invention. The isolation valve system 10 comprises an isolation valve 100, preferably a micromechanical isolation valve, with an inlet 101 at a high pressure side 12 of the isolation valve 100, a debris filter 104 and an outlet 102 at a low pressure side 14 of the isolation valve 100. A flow channel 16 conducts gas from the inlet 101 to the outlet 102 through the isolation valve 100. A capacitive pressure sensor 103 is in this embodiment connected to the high pressure side 12, i.e. at the inlet side. A sensor signal 18 is feed to valve electronics 105. In the present embodiment, the same valve electronics 105 gives the command to open the isolation valve 100. The command is in the present embodiment a current that heats up a part of the valve, causing a phase change of a solid metal disc. This is described more in detail further below. The melting disc permits a membrane in the isolation valve 100 to deflect and finally break, which opens the isolation valve 100. The valve electronics 105 is interfaced to the outer world over an interface connector 106.

Figure 2:
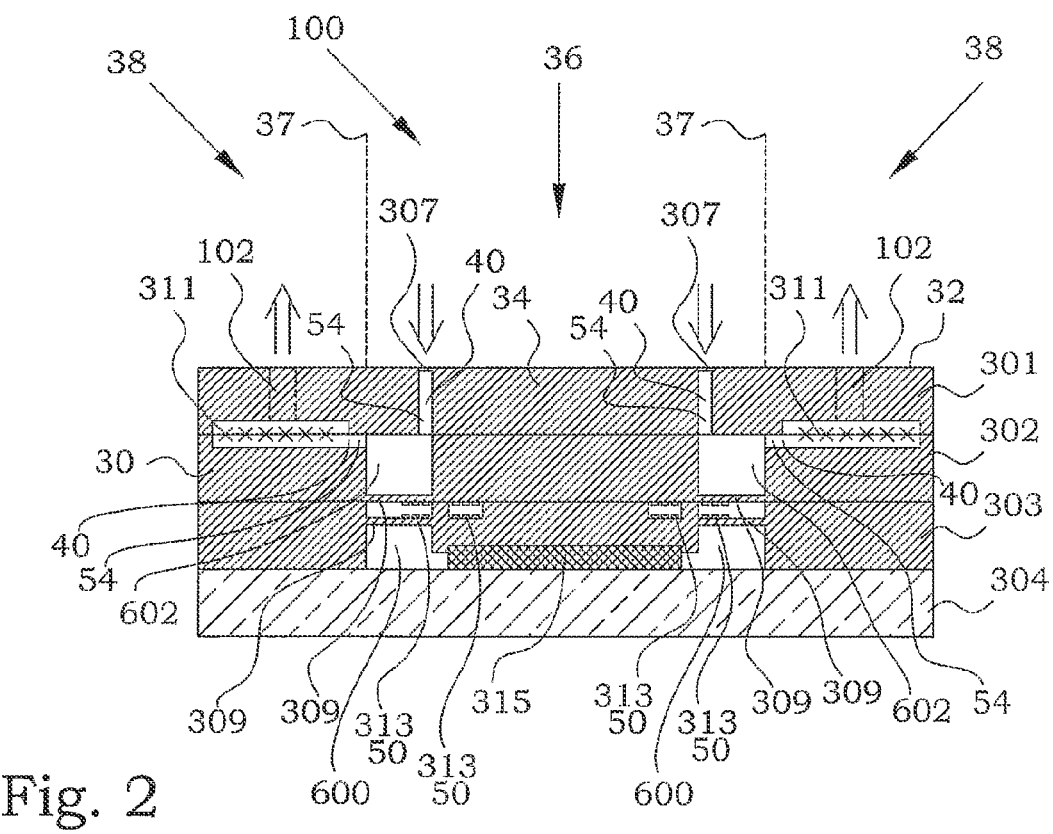
FIG. 2 is a cross-section through a stack of wafers forming an embodiment of a closed isolation valve according to the present invention.

FIG. 2 is a cross-section through a stack 30 of wafers forming an embodiment of a closed isolation valve 100 according to the present invention. The isolation valve 100 is accommodated in a small disc, with very low mass, i.e. the stack 30 and constitutes an advantageous micromechanical substitute for e.g. a conventional pyrotechnical valve. The cross-section through the wafer stack 30 that constitutes the valve assembly can be used to identify the components in the embodiment. The wafer stack 30 comprises four substrates 301-304, i.e. in this case wafers. Three of them 301-303 are micro structured silicon wafers. The fourth substrate 304 is in the present embodiment made of a thermally isolating material, such as glass.

The isolation valve 100, comprises a main body 32 built up by the substrates 301-304 being bonded together. The substrates 301-304 have micromechanical structures created therein, which together form the different items of the isolation valve 100, e.g. an actuator body 34 and a sealing membrane 307. The actuator body 34 is suspended in the sealing membrane 307 at a high pressure portion 36 of the isolation valve. The sealing membrane 307 thereby mechanically attaches the actuator body 34 to the main body 32. The sealing membrane 307 seals the high pressure portion 36 of the isolation valve 100 from a low pressure portion 38 of the isolation valve. Note that when mounted, there will be a sealing provided between the low pressure portion 38 and the high pressure portion 36 indicated by the broken lines 37. A flow channel 40 in the main body 32 is provided from the sealing membrane 307 to the low pressure portion 38 of the isolation valve 100. An outlet 102 is provided in a different cut of the substrate stack 30 and is therefore illustrated by broken lines.

In the present embodiment, the high pressure portion 36 and the low pressure portion 38 are situated at the same side of the stack 30. This can be different in alternative embodiments, where e.g. the high pressure portion 36 and the low pressure portion 38 are provided on opposite sides.

A burst plug 315 is arranged against the substrate 304 of the main body 32 and supports thereby the actuator body 34. When the high pressure is applied onto the actuator body 34, the burst plug 315 prohibits the actuator body 34 to be pushed downwards (with reference to FIG. 2).

An activation arrangement 50, in this embodiment comprising two concentric coils 313, is arranged for allowing an at least partial displacement of the burst plug 315. The at least partial displacement of the burst plug 315 comprises in this embodiment a shape change. The shape change is in the present embodiment allowed by a phase transition of the material of the burst plug 315. The burst plug 315 comprises therefore a metal or metal alloy with a low melting temperature. This is described in more detail below. The activation arrangement 50 in this embodiment comprises therefore a heater arrangement, comprising the coils 313. The coils 313 are parts of a metal film structure arranged in vicinity of the burst plug 315.

The activation arrangement comprises an activation controller (not shown in the present figure), in this embodiment a heater controller. The heater controller is in the present embodiment arranged for driving a high DC-current through the metal film structure, i.e. the coils 313. The operation of the activation controller is preferably controllable from outside the isolation valve system. The heat power dissipated in the coils 313 is conducted to the burst plug 315, after a short period of time resulting in a melting. The high pressure on the actuator body 34 presses down the melted burst plug 315, squeezing out the excess material in a surrounding cavity 600 besides the burst plug 315. The sealing membrane 307 is dimensioned to break by this action of the high pressure when the actuator body is moved down. The moving is allowed to take place over a certain distance by the at least partial displacement of the burst plug 315 described above.

Figure 3:
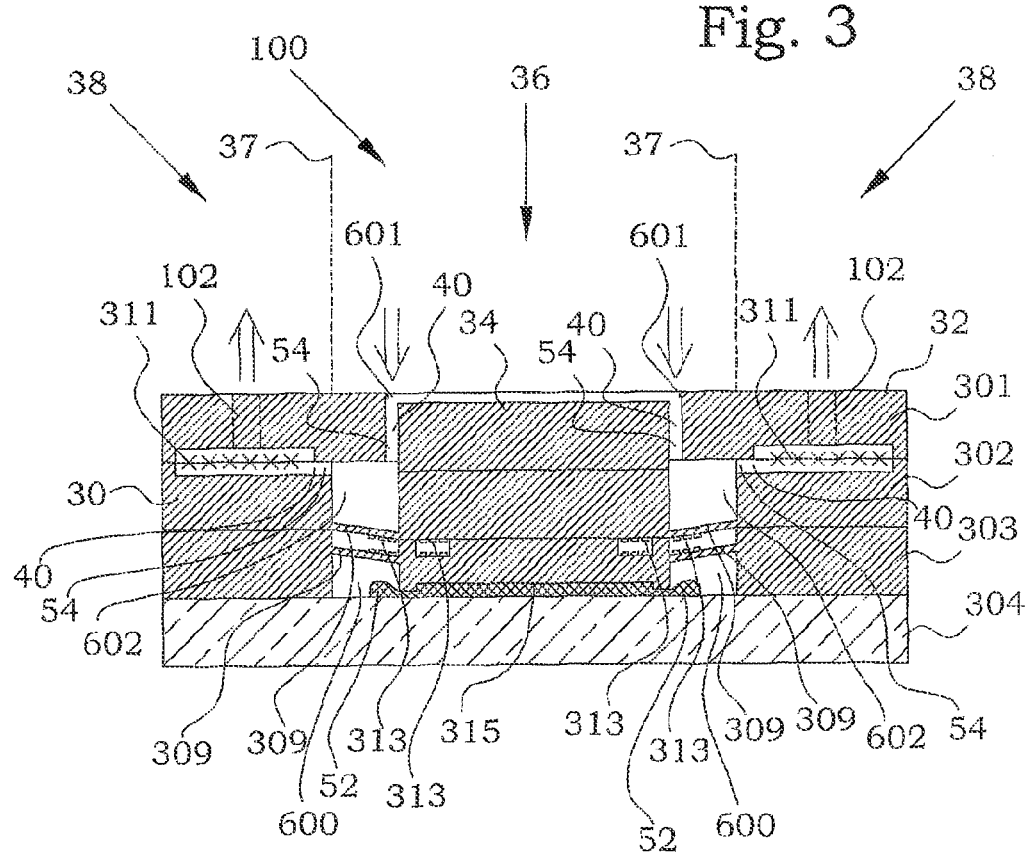
FIG. 3 is a cross-section through the embodiment of FIG. 2 when being opened.

A situation, where the isolation valve is opened is illustrated in FIG. 3. Here, it is easily seen that molten metal 52 from the burst plug 315 is squeezed out in the surrounding cavity 600. The actuator body 34 is moved downwards. This physical movement of the actuator body 34 increases the mechanical strain induced in the sealing membrane 307, which eventually breaks. The sealing membrane 307 is designed to handle the intended maximum high pressure with a specified safety margin, but will break by the additional mechanical strain caused by the movement. An opening 601 to the flow channel 40 is created in the broken sealing membrane 307. Between the actuator body 34 and the surrounding main body 32, there is a free volume 602 in the flow channel 40, which free volume 602 is used to collect any fragments from the broken sealing membrane 307.

The breakage of the sealing membrane 307 is in the present embodiment enabled by use of a low temperature phase change in the burst plug 315. The burst plug 315 is a washer made of a Low Melting Point (LMP) alloy, and is one key element in the valve design. In low temperature, under the yield-point, the washer provides a very rigid support to the actuator body 34 of the isolation valve 100. At higher temperature the burst plug 315 (washer) is softening and starts to melt and flows outwards to the expansion volumes provided by the surrounding cavity 600 around the washer.

The most satisfactory solution in the choice of a suitable LMP alloy is to use an eutectic alloy, which can be expected to fail when it reaches the eutectic temperature. Such alloys are unfortunately few number, but the need can often be supplied by one of the many non-eutectics which show well defined yield points. By the standard the yield point is given within a close range of no more then 2° C., the actual temperature depending on the local conditions such as size and shape of the components, applied pressure and thermal conductivity of the surrounding materials.

There exists a whole range of Tin-Bismuth alloys with a suitable melting temperature between 100-200° C. The engineering compromise that needs to be done is between maximum safe temperature and power consumption to open the valve.

The actual valve function is advantageously combined with additional functions in relation to the opening of the valve. Since a membrane is broken to open the valve, there is always a risk for debris to flow downstream. Furthermore, some kind of flow restriction is often required.

Such functions are integrated in the embodiment of FIGS. 2 and 3. When the sealing membrane 307 breaks, some debris is generated. A particle filter or debris filter 311 is integrated into the flow channel 40. The debris filter 311 stops particles from travelling down stream in the flow channel 40. The structure of the debris filter 311 is based on crossed V-grooves, and is design to stop all spherical particles larger than three microns. The debris filter 311 is formed in a bond interface between two substrates 301, 302. The debris filter 311 is fairly coarse in order not to be clogged as all gas in a tank connected to the isolation valve 100 is supposed to pass through it. If the valve, as typically is the case, in turn is connected to a pressure regulator, an inlet filter on the pressure regulator stops also all smaller particles down to the micron range.

This present design of the debris filter 311 also provides a flow restriction 54. The flow restriction 54 in the flow channel 40 prevents shockwaves to be conducted downstream the flow channel 40.

The debris filter 311 can have other designs as well, and if the debris filter doesn't provide a simultaneous flow restriction 54, a separate flow restriction, e.g. in the form of a narrow passage of the flow channel 40, can be provided. Such additional flow restrictions may also be provided in the present embodiment as complements to the flow restriction provided by the debris filter 311.

The micromechanical isolation valve of the present design has the additional advantage of being easily combined with additional functionality. Examples of such desired functionality that may be integrated in the system is a temperature sensor and a pressure sensor, able to detect high pressures.

The embodiment of FIGS. 2 and 3 is based on a stack of four substrates. However, in alternative embodiments other number of substrates bonded together can be used. The entire design could even be provided within one substrate or body.

Figure 4A:
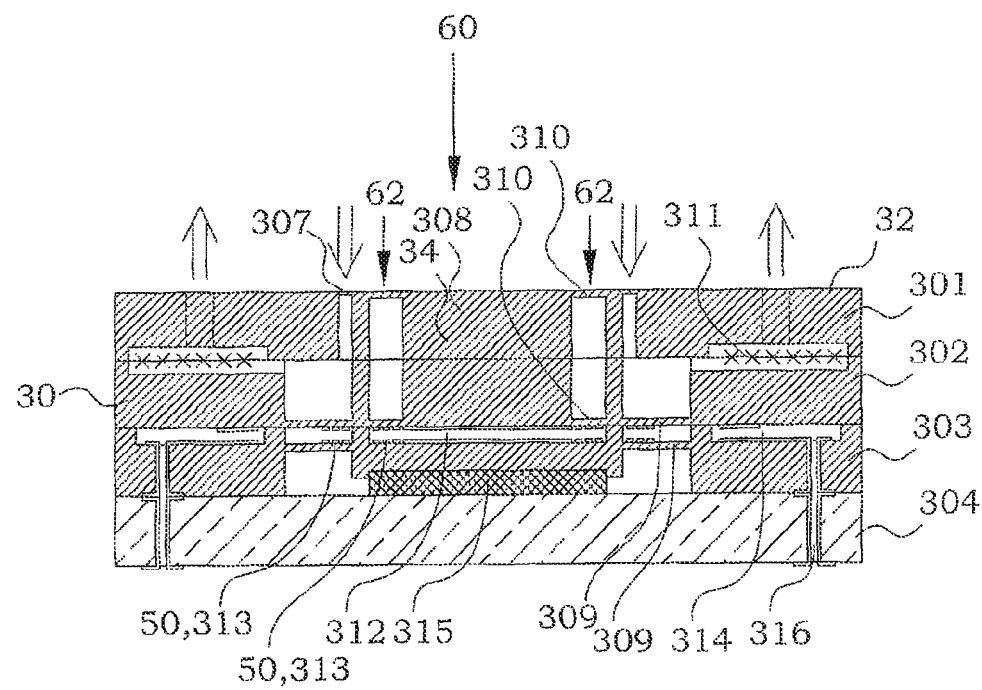
FIG. 4A is a cross-section through a stack of wafers forming an embodiment of a closed isolation valve according to the present invention having an integrated pressure sensor.

FIG. 4A is a cross-section through a stack 30 of wafers 301-304 forming an embodiment of an isolation valve according to the present invention having an integrated pressure sensor 60 arranged at the high pressure portion 36. In FIG. 4A, some reference numbers are omitted in order to increase the readability of the figure. The pressure sensor 60 is in the present embodiment integrated within the actuator body 34. However, the pressure sensor 60 could in alternative embodiments also be provided besides the actuator body 34 within the high pressure portion 36. The herein presented embodiment comprises two functional parts combined to a multifunctional micromechanical isolation valve unit. An integrated pressure sensor 60 is capable to measure the applied high pressure both before and after activating of the one shot valve, i.e. both before and after breakage of the sealing membrane 307. The inner part of the actuator body 34 acts as a separate device, the pressure sensor 60, measuring the input high pressure. The pressure sensor 60 operates according to a principle based on a deflecting membrane. The pressure sensor 60 therefore comprises a deflectable membrane arrangement 62 suspending a pressure sensor body 308.

Figure 4B:
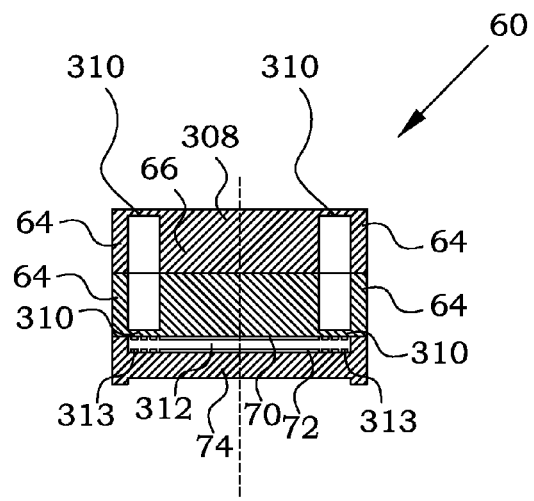
FIG. 4B is a part view of FIG. 4A of the integrated pressure sensor.

FIG. 4B is a part view of FIG. 4A of the integrated pressure sensor 60.

The deflectable membrane arrangement 62 comprises two membranes 310 with side embossments 64 and solid centre embossments 66 bonded together. The pressure sensor body 308 is suspended in one membrane at the top and the other at the bottom. The membrane towards the high pressure side is designed to withstand the maximum inlet pressure, also when maximum deflected. This configuration permits the pressure sensor body 308 to move up or down as a function of the inlet pressure. Such a design makes the pressure sensor 60 relatively rigid and furthermore, the deflectable membranes 310 are mechanically isolated from the isolation valve 100 outside the actuator body 34. The deflectable membrane deflection will thereby only depends on the high pressure and not be dependent on whether the valve is closed or opened.

The deflection is in the present embodiment measured by a capacitive displacement sensor. The solid centre part, a pressure sensor body 308 gives an extremely flat bottom surface 68, which is very suitable to be one electrode 70 in a capacitive sensor 312. An opposite electrode 72 is located on top of a burst plug holder 74. A double layer coil 313 around the capacitance electrodes 70, 72 forms a parallel resonance circuit together with the capacitance electrodes 70, 72. Thereby, a part of the heater arrangement comprises electrical components used also by the capacitive sensor 312 of the pressure sensor 60. Alternatively described, a part of the high pressure sensor 60 is also used as heating elements in the isolation valve. The circuit is driven into resonance by use of a Colpitts oscillator connection.

Figure 5:
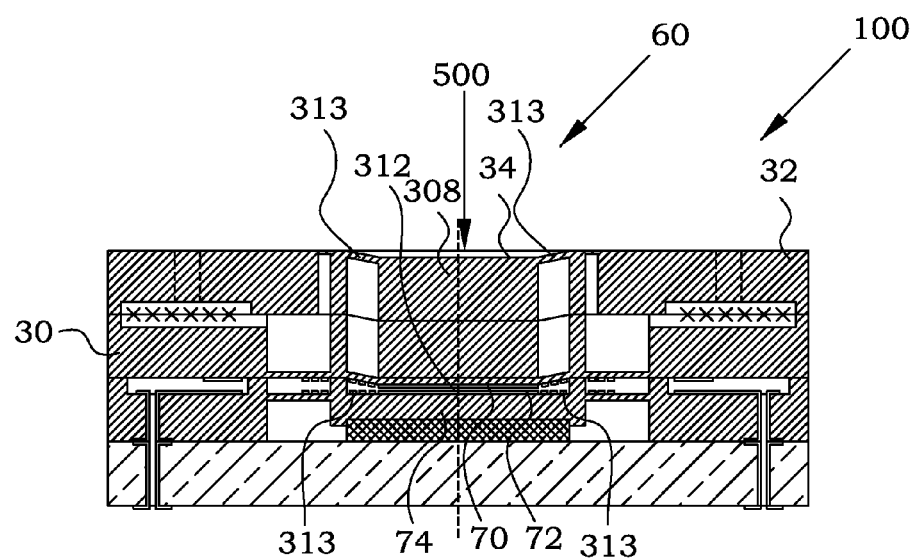
FIG. 5 is a cross-section through the embodiment of FIG. 4A, when pressurized.

A pressure deflection 500 is illustrated in FIG. 5. The decreased distance between the electrode 70, 72 plates in the capacitive sensor 312 is easily seen. In FIG. 5, many reference numbers are omitted in order to increase the readability of the figure.

The physical structure of capacitive displacement sensors is extremely simple. One or more fixed electrode plates are used together with one or more moving electrode plates. Their simplicity and very small temperature coefficients often overshadow the inherent nonlinearity of most capacitive sensors. With a monolithic integration of signal conditioning circuitry, i.e. with pressure sensor read-out electronics comprised in an isolation valve assembly, the additional problem of measuring often miniscule capacitance changes in the face of large parasitic is mitigated.

Although resistive sensors have been widely used in the past, recently, capacitive sensors have begun to emerge in many areas. Capacitive sensors are attractive because they possess a number of important features desirable in many integrated systems. They generally exhibit much lower temperature sensitivity then their resistive counterparts because of the elimination of the temperature-sensitive resistor elements in their structure. They also provide an overall higher sensitivity and resolution, and consume much less power, which makes them suitable for many low-power applications such as in the present invention.

The coils 313 used in the pressure read-out circuitry are preferably etched out from the same metal layers, which are used for forming the capacitor electrodes 70, 72.

In FIGS. 4A and 5, an example of how to electrically connect parts of the stack 30 to any outer circuitry. A hole 316 through wafer 304 and 303 is metallized at the surface. The metallization thereby operates as an electrical via into the interior of the stack 30. The hole 316 leads up to a cavity 314 in wafer 303, from where electrical connections to e.g. the coils 313 and the electrode 70, 72 plates easily can be realized. The metallization at the orifice of the hole 316 provides for an easy connection to any outer electronics.

Similar arrangements can also be provided for further additional functionalities integrated in the stack 30. A temperature sensor, e.g. a thermocouple can be provided anywhere in the stack 30, depending on the most critical temperature to have knowledge about. Since silicon wafers generally have a good thermal conductivity, a thermocouple may be situated within the stack, still measuring a temperature close to the surrounding one.

Figure 6:
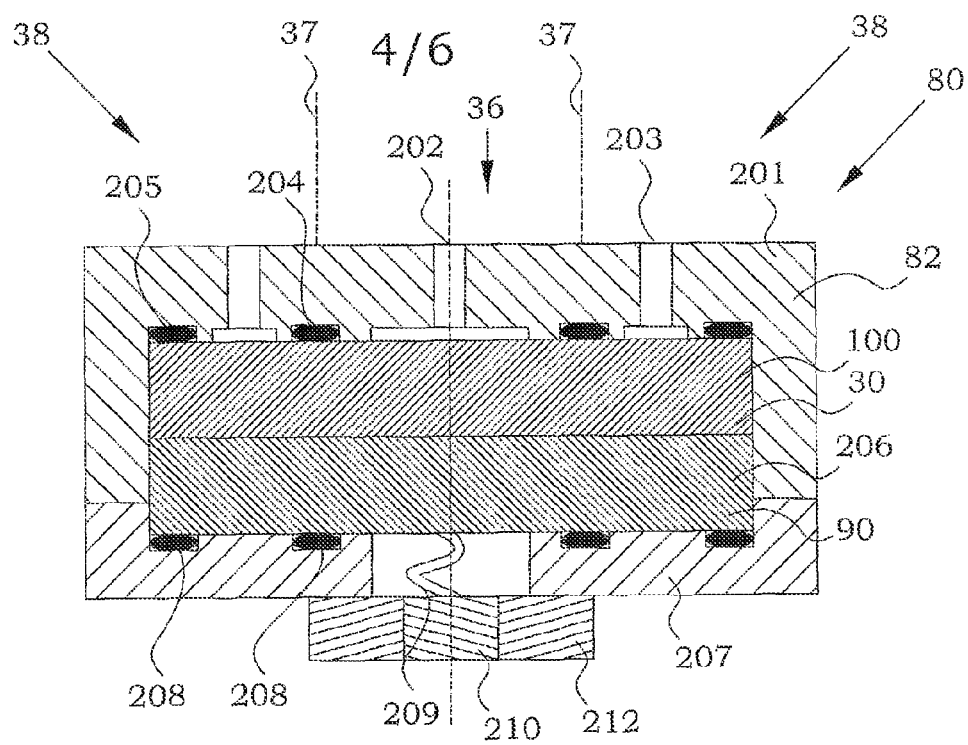
FIG. 6 is a cross-section of an embodiment of an isolation valve assembly.

The micromechanical isolation valve systems presented in the embodiments above are of a shape of a small cylindrical disc with a diameter of typically 10-20 mm and a thickness of typically a few mm. These isolation valve main bodies need to be accommodated, one or several in a conventional pressure resistant housing. FIG. 6 is a cross-section of an embodiment of an isolation valve assembly 80. The practical accommodation of the isolation valve 100 in a metal housing 82, in the present embodiment having two fixed parts 201, 207, is illustrated. The actual isolation valve, any pressure sensor and debris filter are provided in a first wafer stack 30. System electronics 209, such as valve electronics including drive electronics for the activation arrangement, pressure sensor read-out electronics etc. are provided in another wafer stack 90. On this stack 90, a harness 209 is mounted. The harness 209 is connected to an electrical connector interface 210. The high pressure inlet from e.g. tank of high pressure gas is routed to the system through a central hole 202. The outlet from the system comprises one or several holes 203 separated with a high pressure sealing 204. The high pressure sealing 204 comprises one or several o-rings, separating the high pressure portion and the low pressure portion. Another sealing 205 prevents gas from leaking out from system outside the silicon wafer stacks 30, 90. Two other o-rings 208 keep the silicon modules, i.e. the stacks 30, 90, suspended within the metal housing 82.

In the present embodiment, the system electronics 206 is provided by a second stack 90 of at least one substrate, which is different from the first stack 30 of substrates, forming the actual isolation valve. This enables an easy dismounting of the system electronics from the main body of the isolation valve. A lid 212 is provided over the isolation valve 100. The lid 212 comprises an electrical connector interface for the isolation valve main body accommodated under the lid 212.

The complete isolation valve assembly 80, including any integrated high pressure sensor is thus accommodated in a housing 82 with a few cubic centimeters volume, preferably mounted directly on a tank outlet. Such an assembly eliminates a number of mechanical interfaces and support structures. This leads to a greatly reduced mass of a system according to this embodiment.

Figure 7:
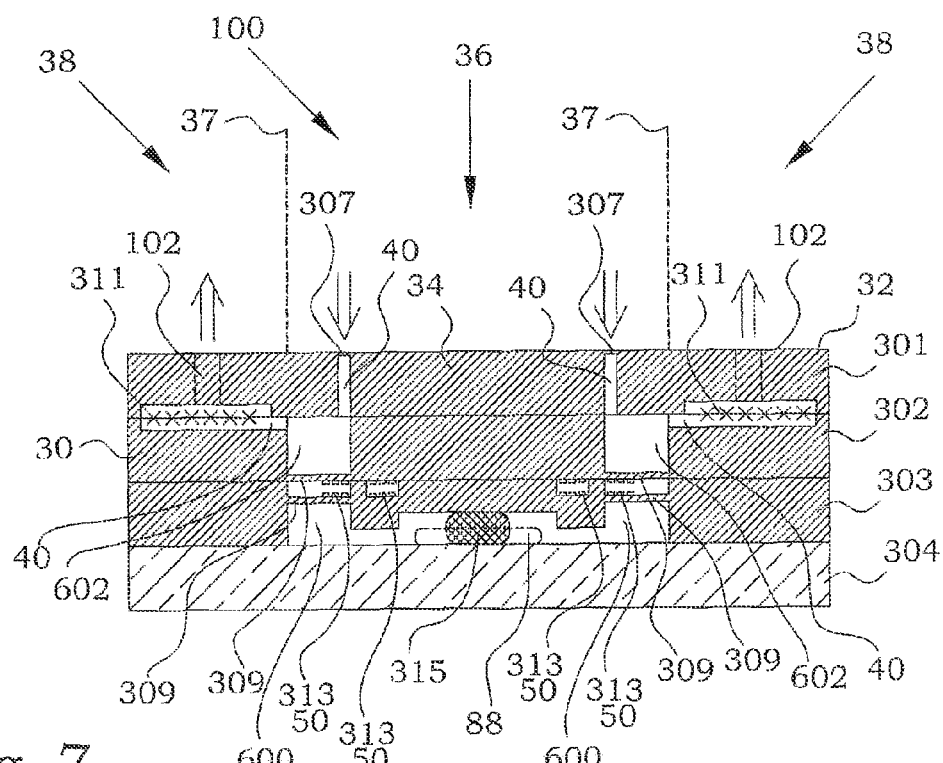
FIG. 7 is a cross-section of another embodiment of an isolation valve according to the present invention.

So far, a phase transition of the burst plug has been used to achieve the at least partial displacement of the burst plug in the described embodiments. Other possible solutions are however also available. One such alternative is presented in FIG. 7, which is a cross-section of another embodiment of an isolation valve according to the present invention. In this embodiment, the burst plug 315 comprises a memory metal. When the temperature of the burst plug 315 is changed, the memory metal will regain a previous shape, indicated by the broken line 88. The shape as indicated by the broken line 88 allows the actuator body 34 to move downwards and thereby break the sealing membrane 307 in analogy with the previous embodiments.

Figure 8:
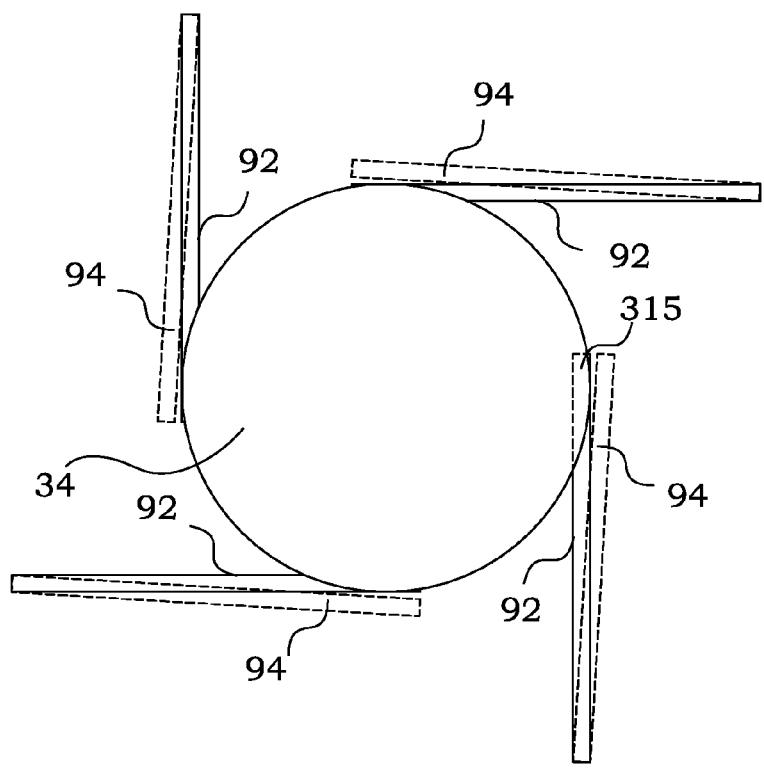
FIG. 8 is a partial top view of another embodiment of an isolation valve according to the present invention.

FIG. 8 is a partial top view of another embodiment of an isolation valve according to the present invention. In this embodiment, the activation arrangement comprises means for removing the burst plug 315 as a support for the actuator body 34. The burst plug 315 comprises in this embodiment four levers 92. The actuator body 34 rests on the end part of these levers 92 when the valve is closed. The levers 92 comprise piezoelectric material, which is able to change its dimensions upon application of an electric field. When the isolation valve is to be opened, the activation arrangement connects a voltage supply to electrodes on the levers 92, which causes the levers to move. This is illustrated by the broken lines 94. In such a situation, the levers, constituting the burst plug 315, do not any more support the actuator body 34. The actuator body 34 is pressed against the bottom substrate and the sealing membrane is caused to break.

Obvious alternative embodiments of the same type may instead use parts of activation arrangement comprising piezoelectric material, which moves away a burst plug 315 of any material.

Also other driving mechanisms can be applied for a similar set-up. The levers 92 can in an alternative embodiment be bimetal levers, which at a low temperature have a shape corresponding to 92 in FIG. 8, but upon heating bends to a shape which removes the front part from the volume beneath actuator body.

Anyone skilled in the art realises that also other designs for the activation arrangement are easy to create, which fall within the scope of the present invention.

Figure 9:
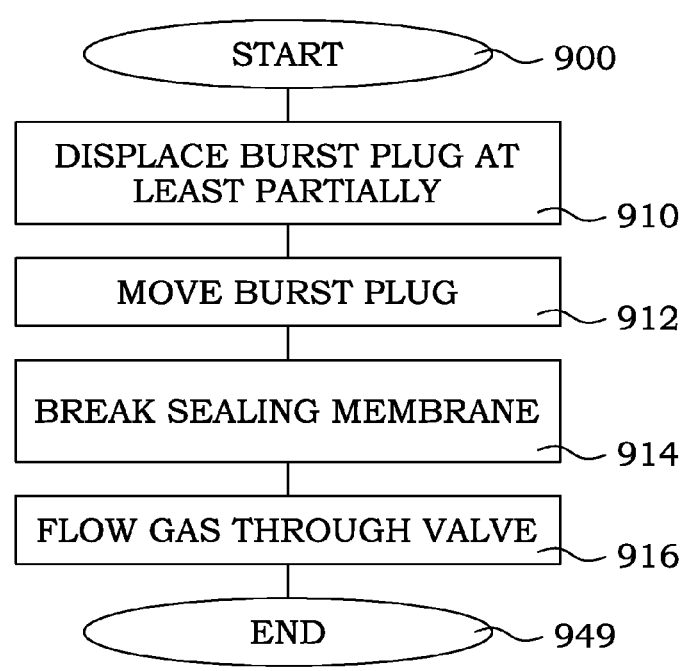
FIG. 9 is a flow diagram of steps of an embodiment of a method for operating an isolation valve according to the present invention.

FIG. 9 is a flow diagram of steps of an embodiment of a method for operating an isolation valve according to the present invention. A method for opening an isolation valve starts in step 900. The valve has a design following the characteristics of the previously described isolation valves. In step 910, a burst plug is displaced at least partially by operating an activation arrangement. In one part embodiment, the displacing comprises heating of the burst plug. If the burst plug is made of a material exhibiting a phase transition, the heating causes a phase transition of the burst plug. In another part embodiment the burst plug is made of a memory metal, whereby the heating causes a shape change of the burst plug. The heating may comprise driving a high DC-current through a metal film structure arranged in vicinity of the burst plug. If the activation arrangement or the burst plug comprises piezoelectric material, the displacing may comprise exposing the piezoelectric material for an electric field, causing a physical movement of the burst plug. The displacing is preferably controlled from outside the isolation valve system. In step 912 a high pressure applied on an actuator body moves the actuator body a distance, which is allowed by the at least partial displacement of the burst plug. If the burst plug exhibited a phase transition, the high pressure presses away at least a part of the phase transitioned burst plug. A sealing membrane breaks in step 914 due to the movement. In step 916, a gas from a high pressure portion of the isolation valve system flows through the broken sealing membrane to a low pressure portion of the isolation valve system. The procedure ends in step 949.

Figure 10:
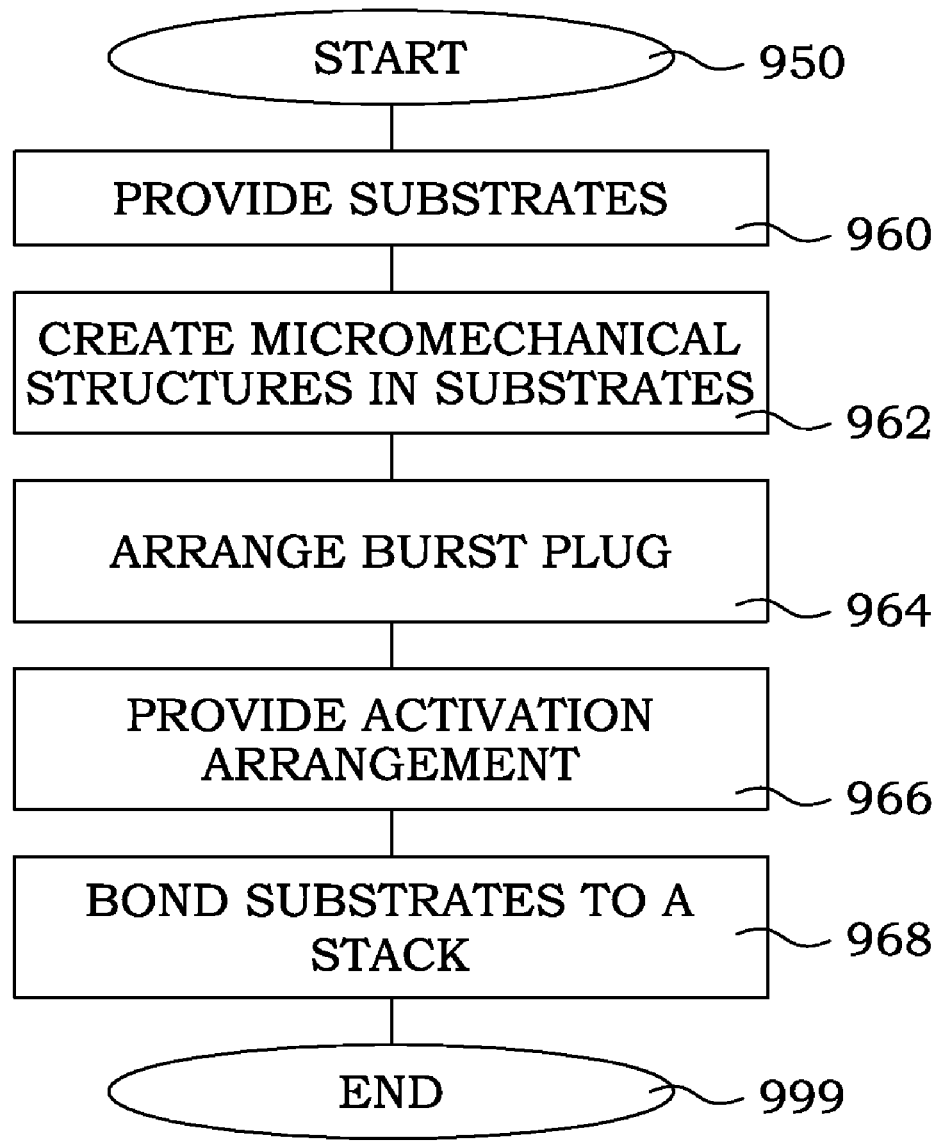
FIG. 10 is a flow diagram of steps of an embodiment of a manufacturing method of an isolation valve according to the present invention.

The present isolation valve concept can be manufactured in many different ways. However, the present design is particularly easy to implement as a small multifunctional micromechanical system. Such systems can be manufactured by methods partially based on micro machining in e.g. silicon. FIG. 10 is a flow diagram of steps of an embodiment of a manufacturing method of an isolation valve according to the present invention. A manufacturing method for an isolation valve starts in step 950. In step 960, a number of substrates are provided. Micromechanical structures are created in the substrates in step 962. The micromechanical structures together form a main body, an actuator body and a sealing membrane. The sealing membrane mechanically connects the actuator body to the main body. In step 964, a burst plug is arranged against the main body and for supporting the actuator body. In step 966 an activation arrangement is provided for allowing an at least partial displacement of the burst plug. Finally, in step 968, the substrates are bonded together into a stack, whereby the sealing membrane becomes arranged for sealing a high pressure portion of the isolation valve system from a low pressure portion of the isolation valve system. The term "bonding" is to be interpreted in a wide sense, whereby the bonding e.g. can be performed as fusion bonding, eutectic bonding, adhesive bonding or soldering. The procedure ends in step 999.

There are at least two main applications for isolation valves according to the present invention. First, they can be used in advanced feed systems for electric propulsion system. Examples of such electric propulsion systems are hall thrusters or other advanced ion thrusters systems. There are also other new high performance systems, with high requirements on mass reductions and low propellant consumption. A second application is on new very small spacecraft, where conventional propulsion components become very difficult to integrate due to their bulky dimensions.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. An isolation valve system, comprising:
   a main body;
   an actuator body;
   a sealing membrane at a high pressure portion of said isolation valve system, mechanically attaching said actuator body to said main body;
   said sealing membrane sealing said high pressure portion of said isolation valve system from a low pressure portion of said isolation valve system;
   a burst plug, arranged against said main body and supporting said actuator body; and
   an activation arrangement arranged for allowing an at least partial displacement of said burst plug;
   whereby said sealing membrane being dimensioned to break by action of said high pressure when said actuator body is moved a distance allowed by said at least partial displacement of said burst plug,
   wherein said main body comprises a first stack of substrates being bonded together, said substrates having micromechanical structures forming at least said actuator body and said sealing membrane.

2. The isolation valve system according to claim 1, wherein said at least partial displacement of said burst plug is a shape change.

3. The isolation valve system according to claim 2, wherein said shape change is allowed by a phase transition of a material of said burst plug.

4. The isolation valve system according to claim 3, wherein said burst plug comprises a metal or metal alloy with a low melting temperature.

5. The isolation valve system according to claim 2, wherein said activation arrangement comprises a heater arrangement.

6. The isolation valve system according to claim 5, wherein said heater arrangement comprises:

a metal film structure arranged in vicinity of said burst plug; and heater controller arranged for driving a high DC-current through said metal film structure.

7. The isolation valve system according to claim 3, wherein said main body comprises a substrate of thermally isolating material, against which said burst plug being arranged.

8. The isolation valve system according to claim 1, wherein said activation arrangement comprises means for removing said burst plug as a support for said actuator body.

9. The isolation valve system according to claim 8, wherein at least one of said burst plug and said activation arrangement comprises piezoelectric material and a voltage supply.

10. The isolation valve system according to claim 1, wherein said main body comprises a flow channel between said sealing membrane and said low pressure portion of said isolation valve system and further comprising a debris filter in said flow channel.

11. The isolation valve system according to claim 10, wherein said debris filter is formed in a bond interface between two wafers.

12. The isolation valve system according to claim 1, further comprising a pressure sensor arranged at said high pressure portion.

13. The isolation valve system according to claim 12, wherein said pressure sensor is integrated within said actuator body.

14. The isolation valve system according to claim 1, further comprising system electronics and wherein said system electronics is provided by a second stack of at least one substrate different from said first stack of substrates.

15. The isolation valve system according to claim 1, further comprising a mechanical housing arranged to accommodate at least one isolation valve main body, wherein said mechanical housing comprises:
   a fixed part with O-ring seals against each said at least one isolation valve main body separating said high pressure portion and said low pressure portion; and
   a lid over each said at least one isolation valve main body, each said lid comprising an electrical connector interface for the isolation valve main body accommodated under said lid.

16. A method for opening an isolation valve, said isolation valve having a main body, an actuator body, a sealing membrane at a high pressure portion of said isolation valve system, mechanically attaching said actuator body to said main body, said sealing membrane sealing said high pressure portion of said isolation valve system from a low pressure portion of said isolation valve system, a burst plug, arranged against said main body and supporting said actuator body; and an activation arrangement, said method comprising the steps of:
   displacing said burst plug at least partially by operating said activation arrangement; and
   moving, by means of said high pressure, said actuator body a distance allowed by said at least partial displacement of said burst plug;
   breaking said sealing membrane by said moving; and
   flowing a gas from said high pressure portion of said isolation valve system through said broken sealing membrane to a low pressure portion of said isolation valve system,
   wherein said step of displacing comprises heating of said burst plug, and
   said step of heating comprises driving a high DC-current through a metal film structure arranged in vicinity of said burst plug.

17. The method according to claim 16, wherein said burst plug is made of a material exhibiting a phase transition, whereby said step of heating causes a phase transition of said burst plug, whereby said high pressure presses away at least a part of said phase transitioned burst plug.

18. A manufacturing method for an isolation valve comprising the steps of:
   providing a number of substrates;
   creating micromechanical structures in said substrates;
   said micromechanical structures together forming a main body, an actuator body and a sealing membrane;
   said sealing membrane mechanically connecting said actuator body to said main body;
   arranging a burst plug against said main body and for supporting said actuator body;
   providing an activation arrangement for allowing an at least partial displacement of said burst plug;
   bonding said substrates together into a stack, whereby said sealing membrane being arranged for sealing a high pressure portion of said isolation valve system from a low pressure portion of said isolation valve system.

* * * * *